US012492685B2

(12) United States Patent
Brown

(10) Patent No.: US 12,492,685 B2
(45) Date of Patent: Dec. 9, 2025

(54) SMA ACTUATOR ASSEMBLY

(71) Applicant: CAMBRIDGE MECHATRONICS LIMITED, Cambridge (GB)

(72) Inventor: Andrew Benjamin Simpson Brown, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 38 days.

(21) Appl. No.: 18/580,259

(22) PCT Filed: Jul. 21, 2022

(86) PCT No.: PCT/GB2022/051888
§ 371 (c)(1),
(2) Date: Jan. 18, 2024

(87) PCT Pub. No.: WO2023/002188
PCT Pub. Date: Jan. 26, 2023

(65) Prior Publication Data
US 2024/0328402 A1 Oct. 3, 2024

(30) Foreign Application Priority Data
Jul. 21, 2021 (GB) ...................... 2110453

(51) Int. Cl.
*F03G 7/06* (2006.01)
*G02B 27/64* (2006.01)

(52) U.S. Cl.
CPC ....... *F03G 7/06143* (2021.08); *G02B 27/646* (2013.01); *G03B 2205/0076* (2013.01)

(58) Field of Classification Search
CPC . F03G 7/0614; F03G 7/06143; G02B 27/646; G02B 27/648; G03B 2205/0076
See application file for complete search history.

(56) References Cited

U.S. PATENT DOCUMENTS

| 5,079,920 | A | 1/1992 | Whitehead et al. |
| 11,054,909 | B2* | 7/2021 | Tanabe ................... G06F 3/016 |
| 2016/0227088 | A1* | 8/2016 | Brown ................... H04N 23/54 |

FOREIGN PATENT DOCUMENTS

| CN | 104847611 A | 8/2015 |
| GB | 2590518 A | 6/2021 |
| JP | 2005-226456 A | 8/2005 |

(Continued)

OTHER PUBLICATIONS

Machine translation of CN 104847611 A, accessed Apr. 23, 2025. (Year: 2025).*

(Continued)

*Primary Examiner* — Jonathan R Matthias
(74) *Attorney, Agent, or Firm* — Van Hoven PC; Stefan D. Osterbur; Joshua Van Hoven

(57) ABSTRACT

An SMA actuator assembly (2) comprising: first and second parts (4,6) that are movable relative to each other; and an SMA wire (10) arranged, on contraction, to drive relative movement of the first and second parts; and a heat transfer material (30) arranged between the first and second parts and around at least a portion of the SMA wire so as to transfer heat between the SMA wire and first and/or second parts, wherein the heat transfer material is configured to deform so as to allow relative movement of the first and second parts.

19 Claims, 1 Drawing Sheet

(56) References Cited

FOREIGN PATENT DOCUMENTS

| | | | |
|---|---|---|---|
| JP | 2014055527 A | * | 3/2014 |
| JP | 2014-088811 A | | 5/2014 |
| JP | 2018-021468 A | | 2/2018 |
| WO | 2017/094085 A1 | | 6/2017 |
| WO | 2019/043599 A1 | | 3/2019 |

OTHER PUBLICATIONS

Machine translation of JP 2014-055527 A, accessed Apr. 23, 2025. (Year: 2025).*
Great Britain Search Report and Written Opinion received for GB Application No. 2110453.4, mailed on Jun. 24, 2022.
International Search Report and Written Opinion received for PCT Patent Application No. PCT/GB2022/051888, mailed on Sep. 1, 2022.

* cited by examiner

SMA ACTUATOR ASSEMBLY

CROSS-REFERENCE TO RELATED APPLICATIONS

This application is a national stage application under 35 U.S.C. § 371 of International Application No. PCT/GB2022/051888, filed Jul. 21, 2022, which claims priority of GB Patent Application No. 2110453.4, filed Jul. 21, 2021, the disclosures of each of which are hereby incorporated by reference herein in their entireties.

FIELD

The present application relates to actuators that use shape memory alloy (SMA) wires to provide relative movement between two components.

BACKGROUND

SMA actuator assemblies are known for use in handheld electronic devices, such as cameras and mobile phones. In particular, they can be used to implement optical image stabilization (OIS) and/or auto-focus (AF) or other zoom functionality in a miniature camera. They can also be used to provide haptic functionality for tactile feedback, for example in response to a user selecting a particular area of a screen or pressing a button. SMA actuators typically function by using the contraction of an SMA wire to cause relative motion of two components. In haptics assemblies, the SMA wire may be in contact with parts of two opposing bodies which are forced in opposite directions due to the change in length of the SMA wire as it contracts. The tactile feedback may be in the form of a 'click' sensation, vibrations, or similar.

SMA wire contracts when it is heated, for example by applying appropriate electrical power signals to the SMA wire. When the SMA wire cools down, it can be brought back to its elongate state by applying an appropriate tensile force, for example using other SMA wires or resilient elements. It is desirable to provide an SMA actuator assembly in which cooling of the SMA wire is increased, without impeding relative motion of the components of the SMA actuator assembly.

SUMMARY

According to an aspect of the present invention, there is provided an SMA actuator assembly comprising: first and second parts that are movable relative to each other; and an SMA wire arranged, on contraction, to drive relative movement of the first and second parts; and a heat transfer material arranged between the first and second parts and around at least a portion of the SMA wire so as to transfer heat between the SMA wire and first and second parts, wherein the heat transfer material is configured to deform so as to allow relative movement of the first and second parts.

The SMA wire is arranged around at least a portion of the SMA wire, for example around at least 50% of the length of the SMA wire, preferably at least 75% or 90% of the length of the SMA wire. The heat transfer material may fully encompass the portion of the SMA wire, i.e. the portion of SMA wire may be in direct contact with the heat transfer material. The heat transfer material is arranged between the first and second parts, so the heat transfer material may be in direct contact with both the first and second parts. As such, the heat transfer material is deformed on relative movement of the first and second parts.

The heat transfer material may improve the cooling rate of the SMA wire, thus leading to faster response times and allowing the SMA wire to be actuated at higher frequencies. Deformation of the heat transfer material ensures that relative movement of the first and second parts is not impeded.

In some embodiments, the heat transfer material is arranged to undergo shear deformation when the first and second parts are moved relative to each other. The heat transfer material may have a shear modulus, in a direction parallel to the relative movement between first and second parts, of less than 100 kPa, preferably less than 10 kPa, further preferably less than 1 kPa. This may allow the first and second parts to move relative to one another without excessive resistance to movement due to shearing of the heat transfer material. The heat transfer material may be arranged not to undergo compression or extension when the first and second parts are moved relative to each other. This may reduce the risk of damage to the heat transfer material on relative movement of the first and second parts.

In some embodiments, the first and second parts are movable relative to each other along one or two movement axes. So, the first and second parts may be movable relative to each other along a single axis only, or in one degree of freedom. Relative movement of the first and second parts in other degrees of freedom, or movement other than along the single axis, may be constrained. Alternatively, first and second parts may be movable relative to each other in a movement plane, e.g. translationally and/or rotationally in the movement plane. Relative movement of the first and second parts outside the movement plane, so movement along an axis perpendicular to the movement plane, or tilting about axes in the movement plane, may be constrained. The movement constraints may be provided using one or more bearing arrangements, e.g. ball bearings, flexure bearings or plain bearings. In some cases, the heat transfer material may act as a bearing and guide movement of the first and second parts relative to each another.

In some embodiments, the thickness of the heat transfer material in a direction perpendicular to the one or two movement axes is greater than a thickness at which the heat transfer material would undergo shear failure, over the entire range of relative movement of the first and second parts. This reduces damage to the heat transfer material on movement. The ratio of i) the thickness of the heat transfer material in a direction perpendicular to the one or two movement axes and ii) a thickness at which the heat transfer material would undergo shear failure may be greater than 1.5, preferably greater than 2, further preferably greater than 3 or greater than 5, over the entire range of relative movement of the first and second parts. The absolute thickness of the heat transfer material may depend on the shear properties of the heat transfer material itself.

In some embodiments, the minimum thickness of the heat transfer material in a direction perpendicular to the one or two movement axes is greater than 10 µm, preferably greater than 20 µm, further preferably greater than 50 µm, most preferably greater than 150 µm. Such a minimum thickness ensures that the heat transfer material can be reliably applied between first and second parts and around the SMA wire.

In some embodiments, the minimum thickness of the heat transfer material in a direction perpendicular to the one or more movement axes is less than 4 mm, preferably less than 2 mm, further preferably less than 1.5 mm, most preferably less than 1 mm or less than 600 µm. This allows the SMA actuator assembly to be made compact in a direction perpendicular to the movement axis.

In some embodiments, the heat transfer material has a thermal conductivity greater than 0.1 W/K. The heat transfer material may comprise thermally conductive particles, in particular metal particles. The heat transfer material comprises one or more of rubber, silicone, a gel, and a liquid.

In some embodiments, the heat transfer material is an elastic material and is further configured to bias the relative position of the first and second parts to a starting position. So, the heat transfer material may apply a biasing force opposing contraction of the SMA wire. On cooling of the SMA wire, the biasing force may act to elongate the SMA wire.

In some embodiments, the heat transfer material is arranged to suspend the first and second parts relative to each other. So, the heat transfer material may be arranged to support the second part on the first part. The second part may thus be held on the first part, e.g. even when the SMA wire is slack (i.e. unpowered).

In some embodiments, the heat transfer material is arranged to guide relative movement of the first and second parts. So, the heat transfer material may at least contribute to the movement constraints between the first and second parts. The heat transfer material may be arranged to guide relative movement in a plane or to guide relative movement along a movement axis.

In some embodiments, the first and second parts are movable relative to each other along a movement axis; wherein the first part comprises at least one contact portion making contact with the SMA wire on a first side of the SMA wire along the movement axis, the second part comprises plural contact portions making contact with the SMA wire on a second side of the SMA wire along the movement axis, opposite to the first side, the at least one contact portion of the first part and the plural contact portions of the second part alternating in a direction normal to the movement axis and being relatively positioned so as to guide the SMA wire along a tortuous path such that the first and second parts are driven in opposite directions along the movement axis on contraction of the SMA wire.

In some embodiments, the heat transfer material is arranged between adjacent contact portions of the first and second parts in a direction perpendicular to the movement axis. In some embodiments, the SMA actuator assembly comprises a gap between the heat transfer material and the first and/or second parts in a direction along the movement axis.

In some embodiments, the length of SMA wire is connected at each end to either one of the first and second parts by a respective connection element that holds the SMA wire, optionally wherein the connection element is a crimp element.

In some embodiments, each of the parts has plural contact portions.

In some embodiments, the first part comprises a first body; the second part comprises a second body; the at least one contact portion of the first body comprises at least one tooth; the plural contact portions of the second body comprise plural teeth; the teeth of the first and second bodies alternate in a direction normal to the movement axis and overlap in a direction parallel to the movement axis; and the contacts of the length of SMA wire with the teeth of the first and second bodies alternate between the teeth of the first body and the teeth of the second body.

In some embodiments, the heat transfer material is arranged between the teeth of the first and second bodies in a direction perpendicular to the movement axis.

In some embodiments, the SMA actuator assembly is arranged to provide a haptic effect.

In some embodiments, the SMA actuator assembly further comprises a lens element fixed relative to one of the first and second parts and an image sensor fixed relative to the other of the first and second parts.

In some embodiments, the first and second parts are movable relative to each another along two orthogonal axes, and wherein the SMA actuator assembly comprises a total of four SMA wires in an arrangement where none of the SMA wires are collinear, and where the SMA wires are capable of being selectively driven to move the first and second parts relative to each other along the two orthogonal axes without applying any net torque between the first and second parts.

In some embodiments, two of the SMA wires are connected between the first and second parts to each apply a torque between the first and second parts in a first sense around an axis perpendicular to the two orthogonal axes, and the other two SMA wires are connected between the first and second part to each apply a torque between the first and second parts in a second, opposite sense around the axis perpendicular to the two orthogonal axes.

Further aspects of the present invention are defined by the dependent claims and set out in the detailed description below.

BRIEF DESCRIPTION OF THE DRAWINGS

Certain embodiments of the present invention will now be described, by way of example only, with reference to the accompanying drawings in which.

DETAILED DESCRIPTION

SMA Haptic Assembly

Figure 1:
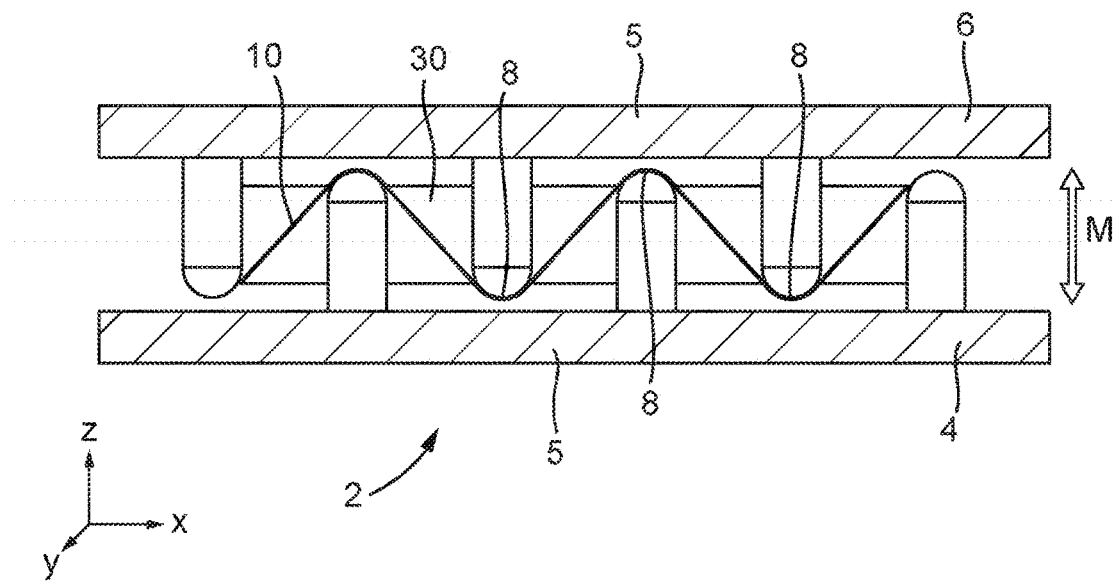
FIG. 1 is a schematic view of an SMA actuator assembly, in particular for providing haptic feedback, according to the present invention.

FIG. 1 shows an embodiment of an SMA actuator assembly 2 according to the present invention. The SMA actuator assembly is an SMA haptic assembly 2. The SMA haptic assembly 2 comprises first and second parts 4, 6 that are movable relative to each other, specifically along a movement axis M. The relative movement of the first and second parts 4, 6 provides a haptic effect to the user. The SMA haptics assembly 2 further comprises an SMA wire 10 and a heat transfer material 30.

The SMA haptic assembly 2 may be used in applications such as mobile telephones, wearable devices, cameras, computer accessories such as trackpads, media players, portable digital assistants (PDAs), or other mobile devices. In some embodiments, the SMA haptic assembly 2 is integrated into a larger device. In some embodiments, one of the first and second parts 4, 6 may be a static part or support structure, which does not move relative to the device during actuation of the SMA haptic assembly 2, and the other of the first and second parts 4, 6 may be a moving or movable part which does move relative to the device during actuation of the SMA haptic assembly 2. Alternatively, both parts 4, 6 may move during actuation.

The first part 4 comprises a first body 4. The second part 6 comprises a second body 6. The first and second bodies 4, 6 shown in FIG. 1 are solid bodies that may be formed by injection moulding or milling. However, it is not essential that the parts be formed in this way, and in some embodiments, the parts may take other forms, for example being hollow or formed from sheet material. In some embodiments, the first and/or the second parts 4, 6 are integrally formed from sheet material, such as sheet metal. The first and/or second parts 4, 6 may be formed by deforming a flat sheet material.

The SMA wire 10 of the SMA haptic assembly 2 is arranged, on contraction, to drive relative movement of the first and second parts 4, 6. In the depicted embodiment, each end of the SMA wire 10 is connected to the first part 4 or second part 6. In some embodiments, the ends of the SMA wire 10 are connected to different ones of first and second parts. Preferably, the length of SMA wire 10 is connected at each end to the same part, i.e. both ends of the SMA wire 10 are connected to the first part 4 or both ends are connected to the second part 6. Connecting both ends to the same part reduces the force between the first and second parts 4 and 6 in a direction perpendicular to the movement axis M during actuation of the SMA haptic assembly. In some embodiments, the SMA wire 10 is connected at each end to the first part 4. This may be preferable in embodiments where the first body 4 is a static body.

In some embodiments, the SMA wire 10 is connected at each end to either one of the first and second bodies 4 and 6 by a respective connection element (not shown) that holds the SMA wire 10. The connection element may provide a mechanical and an electrical connection to the SMA wire 10. Any suitable means or wire attachment device may be used as the connection element to hold the SMA wire 10. In some embodiments, one or both of the connection elements is a crimp portion. The crimp portion may be fixed to the first body 4 or second body 6. The crimp portion may be integrally formed with the first or second body 4, 6, in particular when the first or second body 4, 6 is formed from sheet material or specifically sheet metal. The crimp portion crimps the end of the SMA wire 10. This may be achieved by compressing the end of the wire 10 between two pieces of deformable material. Using a metal crimp portion may be desirable, in particular where the crimp is used to make electrical connection to the SMA wire 10 as well as fixing the SMA wire 10 to the first body 4 or second body 6.

The first part 4 comprises at least one contact portion 8 making contact with the SMA wire 10 on a first side of the SMA wire 10 along the movement axis M. The second part 6 comprises at least one contact portion 8 making contact with the length of SMA wire 10 on a second side of the length of SMA wire 10 along the movement axis M, opposite to the first side. In the embodiment of FIG. 1, the first part 4 has two contact portions 8 and the second part has two contact portions 8, although more generally the first and second parts 4, 6 could be modified to have any number of contact portions 8.

In some embodiments, the first part 4 comprises plural contact portions 8. In some embodiments, the second part comprises plural contact portions 8. Providing plural contact portions 8 on one or both of the first and second parts 4, 6 increases the total force applied by the length of SMA wire 10 between the first and second parts 4, 6 while minimising the extent of the length of SMA wire 10 along the movement axis M. In embodiments where the one of the first and second parts 4, 6 comprises plural contact portions 8, the one of the first and second parts 4, 6 further comprises at least one connection portion 5 connecting the contact portions 8 together. Where both of the first and second parts 4, 6 comprise plural contact portions 8, then both of the first and second parts 4, 6 further comprise at least one connection portion 5.

Where at least one of the first and second parts 4, 6 comprises at least one connection portion 5, the connection portion 5 may be provided in different configurations. In some embodiments, the at least one connection portion 5 extends between the portions connected thereby along a lateral side of the SMA wire 10 in a direction normal to the movement axis M. In other embodiments, the at least one connection portion 5 is positioned relative to the SMA wire 10 along the movement axis M, as shown in FIG. 1. In some embodiments, the connection portion 5 is planar.

The contact portions 8 of the first and second parts 4, 6 alternate in a direction normal to the movement axis M. This means that for any contact portions 8 on either of the first and second parts 4, 6, the nearest adjacent contact portion 8 will be a contact portion 8 of the other of the first and second parts 4, 6. In some embodiments, the contact portions 8 overlap in a direction parallel to the movement axis M. The overlapping of the contact portions 8 means that the uppermost portion of a contact portion 8 on the lower part is above the lowermost portion of the adjacent contact portion 8 of the upper part (where 'up' for this purpose is defined as being in the positive z direction, along the movement axis M, in direction of movement of the second part 6 relative to the first part 4 on contraction of the length of SMA wire 10). However, this is not essential, and in other embodiments the contact portions 8 of the first and second parts 4, 6 may not overlap in a direction parallel to the movement axis M.

The shape of the contact portions 8 can be any suitable shape to provide contact with the SMA wire 10. In the embodiments shown in the figures, the uppermost portion of the contact portions 8 has a curved, or wave-like shape. However, other shapes could be used. For example, the uppermost portion of the contact portions 8 may be pointed, or the uppermost portion of the contact portions 8 may be flat. Furthermore, the lowermost portion of the teeth 8 may be triangular, or may be rectangular (as shown in the figures) or any other shape.

In the depicted embodiment, the contact portions 8 comprise teeth 8. The teeth 8 of the first and second parts 4, 6 alternate in a direction normal to the movement axis M and overlap in a direction parallel to the movement axis M. The teeth 8 protrude from a respective connection portion 5 of each of the first and second parts 4, 6. The connection portion 5 connects respective teeth 8 of each part 4, 6. For example, the first body 4 has at least one tooth 8 and the second body 6 has plural teeth 8. In the embodiments shown in the figures, the teeth 8 of the first and second bodies 4, 6 are substantially solid and moulded integrally with the respective body. However, in general, this is not essential, and the contact portions of the parts may take other forms, for example being hollow, being formed separately from the bodies, or being formed from other materials such as sheet metal.

The teeth 8 of the first body 4 make contact with the SMA wire 10 from below on a first side of the SMA wire 10 along the movement axis M, and the teeth 8 of the second body 6 make contact with the SMA wire 10 from above on a second side of the SMA wire 10 along the movement axis M, opposite to the first side. The SMA wire 10 extends between the first and second bodies 4 and 6 and is guided along a tortuous path between the first and second bodies 4 and 6 by the teeth 8, making contact with the teeth 8. The tortuous path is any path which is not a straight line between the points at which the ends of the SMA wire 10 are connected to the first or second bodies. The tortuous path followed by the SMA wire 10 will therefore have a wire length (that is the length following the path of the length of SMA wire 10) which is greater than the shortest distance between the connection elements. The tortuosity of the tortuous path may be measured using a ratio of the length of the tortuous path to the shortest distance between the connection elements.

So, the contacts of the length of SMA wire 10 alternate between the teeth 8 of the first and second bodies 4 and 6. In some embodiments, the SMA wire 10 crosses from the first body 4 to the second body 6 (and back again) two or more times. In some embodiments, such as that shown in FIG. 1, the length of SMA wire 10 makes contact with all of the teeth 8 of the first body 4 and all of the teeth 8 of the second body 6 in the aforementioned alternating manner.

The teeth 8 of the first body 4 and the teeth 8 of the second body 6 are relatively positioned, and the alternating contacts of the length of SMA wire 10 with the teeth 8 of the first and second bodies 4 and 6 are such that the first and second bodies 4 and 6 are driven apart along the movement axis M on contraction of the length of SMA wire 10. The length of SMA wire 10 is arranged so that when the length of SMA wire 10 contracts, the first and second bodies move away from each other.

Although not shown in FIG. 1, the SMA actuator assembly 2 may comprise a suspension system which holds the two parts 4, 6 relative to one another and allows them to move along the movement axis M. The suspension system may permit movement of the two bodies 4, 6 relative to one another along the movement axis M, while restricting or preventing relative movement of the two bodies 4, 6 in the plane perpendicular to the movement axis M. The suspension system (or some other arrangement) may also restrict or prevent relative rotation of the two bodies 4, 6, for example due to an off-centre force applied to the SMA actuator assembly 2 by a user.

Furthermore, although not shown, the two parts 4, 6 may be provided with end-stops that limit relative movement of the two parts 4, 6 towards and/or away from each other. The endstops may define a range of relative movement of the first and second parts, for example. The endstops may comprise a surface on the first part and a corresponding surface on the second part that come into contact at a limit of the range of relative movement of the first and second parts 4, 6. The end-stops may be provided partly by protrusions on the same one of the two parts, for instance the first part 4. Alternatively, the endstops may be provided partly on protrusions on different ones of the two parts, e.g. at different ends of the SMA actuator assembly 2, or endstops may be provided on both parts e.g. at both ends of the SMA actuator assembly 2. The endstops may define a minimum and/or a maximum separation (along the movement axis M) of the first and second parts 4 and 6. In some embodiments, the minimum separation will be that in a resting position when the SMA actuator assembly 2 is not actuated, i.e. when the SMA wire 10 is not contracted.

Optionally, the SMA actuator assembly 2 includes a biasing arrangement (e.g. a resilient element such as a spring) to provide a force ("a return force") urging the two parts 4, 6 together along the movement axis M such that, when the power to the length of SMA wire 10 is reduced or stopped, the length of SMA wire 10 expands as it cools and the two bodies 4, 6 move back e.g. towards the resting position. In other embodiments, the SMA actuator assembly 2 does not include such an arrangement, in which case the return force can be provided by a user (e.g. by a finger press) on an area of the electronic device to which the SMA actuator assembly 2 is coupled.

OIS SMA Actuator Assemblies

Figure 2:
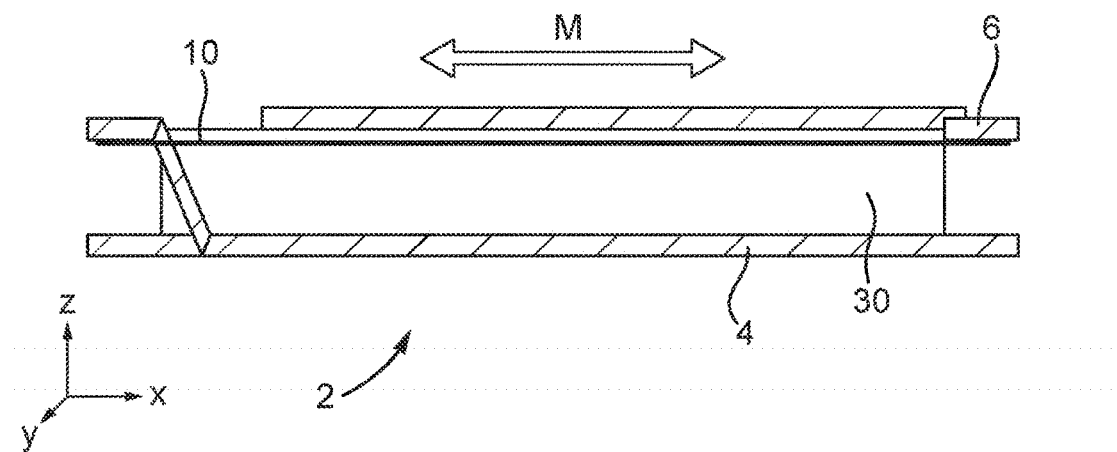
FIG. 2 is a schematic view of another SMA actuator assembly, in particular for providing OIS, according to the present invention.

FIG. 2 schematically depicts a further embodiment of an SMA actuator assembly 2 according to the present invention. The SMA actuator assembly 2 comprises a first part 4 and a second part 6. The SMA actuator assembly 2 further comprises an SMA wire 10 and a heat transfer material 30.

In the SMA actuator assembly 2 of FIG. 2, the second part 6 is movable relative to the first part 4 along two orthogonal axes (i.e. the x and y axes). So, the second part 6 is movable relative to the first part 4 in a movement plane M.

The SMA actuator assembly 2 comprises one or more SMA wires 10. The SMA wires 10 may be connected in tension between the first and second parts 4, 6 using connection elements, for example crimp elements. The crimp connections may crimp the SMA wires to hold them mechanically, as well as providing electrical connections to the SMA wires 10. However, any other suitable connections may alternatively be used. The SMA wires 10 are capable, on selective contraction, of driving relative movement of the first and second parts 4, 6.

The SMA actuator assembly 2 may be an SMA OIS assembly 2. So, the SMA actuator assembly 2 may comprise an image sensor fixed relative to one of the first and second parts 4, 6, and a lens element fixed to the other of the first and second parts 4, 6. The first and second parts 4, 6, and so the lens element and image sensor, may be controllably moved so as to implement OIS, for example by counteracting acceleration (e.g. due to hand shake of a user) experienced by a device in which the SMA actuator assembly 2 is incorporated. The lens element or image sensor may be moved relative to each other in the plane orthogonal to the optical axis of the lens element. The SMA actuator assembly 2 may be incorporated into a camera apparatus. So, there is disclosed a camera apparatus that comprises the SMA actuator assembly 2. The camera apparatus may be incorporated in a portable electronic device such as a mobile telephone, or tablet computer.

The second part 6 may be supported (so suspended) on the first part 4 exclusively by the SMA wires 30. However, preferably, the SMA actuator assembly 2 comprises a bearing arrangement that supports the second part 6 on the first part 4. The bearing arrangement may have any suitable form for allowing movement of the second part 6 with respect to the first part 4 in the x-y plane. For this purpose, the bearing arrangement may, for example, comprise a rolling bearing, a flexure bearing or a plain bearing. The bearing arrangement may constrain or prevent movement of the second part 6 relative to the first part 4 in the z-direction. The bearing arrangement may constrain movement in the x-y plane within a particular range of movement.

The SMA wires may be arranged so as to, on selective contraction, move the second part 6 relative to the first part 4 along two orthogonal axes (the x and y axes, for example). In particular, the SMA actuator assembly may corresponds to the SMA actuation apparatus of WO 2013/175197 A1, which is herein incorporated by reference. The SMA actuator assembly may also corresponds to the SMA actuation apparatus of WO 2017/072525 A1, which is herein incorporated by reference So, the SMA actuator assembly may comprise a total of four SMA wires 10 in an arrangement where none of the SMA wires are collinear, and where the SMA wires 10 are capable of being selectively driven to move the first and second parts relative to each other along the two orthogonal axes without applying any net torque between the first and second parts.

In particular, two of the SMA wires 10 may be connected between the first and second parts 4, 6 to each apply a torque between the first and second parts 4, 6 in a first sense around an axis perpendicular to the two orthogonal axes (i.e. the optical axis), and the other two SMA wires are connected between the first and second part to each apply a torque between the first and second parts in a second, opposite sense around the axis perpendicular to the two orthogonal axes.

Furthermore, although not shown, the two parts 4, 6 may be provided with end-stops that limit relative movement of the two parts 4, 6 in the movement plane M. The endstops may define a range of relative movement of the first and second parts, for example. The endstops may comprise a surface on the first part and a corresponding surface on the second part that come into contact at a limit of the range of relative movement of the first and second parts 4, 6. The endstops may define a movement envelope in the movement plane M within which the first and second parts 4, 6 may move relative to each other.

Optionally, the SMA actuator assembly 2 includes a biasing arrangement (e.g. a resilient element such as a spring) to provide a force ("a return force") urging the two parts 4, 6 to a move to a relative resting position or central position, for example when the power to the length of SMA wire 10 is reduced or stopped.

Other SMA Actuator Assemblies

The embodiments of FIGS. 1 and 2 are just two examples of an actuator assembly that uses SMA to move a movable part relative to a support structure. Embodiments of the present invention include any actuator assemblies in which an SMA wire is arranged to move two parts relative to each other.

The SMA actuator assembly 2 may allow for relative movement of the first and second parts 4, 6 along a single axis only. The single axis may be an optical axis of a lens element of the SMA actuator assembly 2. In such an SMA actuator assembly 2, AF may be achieved.

For example, in some embodiments, the SMA actuator assembly corresponds to the SMA actuation apparatus of WO 2007/113478 A1, which is herein incorporated by reference. So, the SMA actuator assembly may comprise a support structure; a camera lens element supported on the support structure by a suspension system which guides movement of the camera lens element relative to the support structure along the optical axis of the camera lens element; and at least one pair of lengths of SMA wire held in tension between the camera lens element and the support structure, the lengths of SMA wire in the pair being coupled to one of the camera lens element and the support structure at a common point and extending therefrom at acute angles of opposite sign relative to the optical axis as viewed radially of the optical axis, the lengths of SMA wire in the pair extending at an angle of less than 180 degrees relative to each other as viewed along the optical axis.

In some other embodiments, the SMA actuator assembly corresponds to the SMA actuation apparatus of WO 2019/243849 A1, which is herein incorporated by reference. So, the SMA actuator assembly may comprise a support structure; a movable element; a helical bearing arrangement supporting the movable element on the support structure and arranged to guide helical movement of the movable element with respect to the support structure around a helical axis; and at least one shape memory alloy actuator wire connected between the support structure and the movable element in, or at an acute angle to, a plane normal to the helical axis and arranged, on contraction, to drive rotation of the movable element around the helical axis which the helical bearing arrangement converts into said helical movement.

The SMA actuator assembly 2 may allow for relative movement of the first and second parts 4, 6 along three orthogonal axes, or relative rotation of the first and second parts 4, 6 about three orthogonal axes. In such an SMA actuator assembly 2, both OIS and AF may be achieved using a single SMA actuator assembly 2.

For example, in some embodiments, the SMA actuator assembly corresponds to the SMA actuation apparatus of WO 2011/104518 A1, which is herein incorporated by reference. So, the SMA actuator assembly may comprise a support structure; a movable element supported on the support structure in a manner allowing movement of the movable element relative to the support structure; and eight SMA actuator wires inclined with respect to a notional primary axis with two SMA actuator wires on each of four sides around the primary axis, the SMA actuators being connected between the movable element and the support structure so that on contraction two groups of four SMA actuator wires provide a force on the movable element with a component in opposite directions along the primary axis, the SMA actuator wires of each group being arranged with 2-fold rotational symmetry about the primary axis. The SMA actuator assembly 2 may also be an SMA haptic assembly 2 other than the SMA haptic assembly described in relation to FIG. 1.

For example, in some embodiments, the SMA actuator assembly corresponds to the SMA actuation apparatus of WO 2019/162708 A1, which is herein incorporated by reference. So, the SMA actuator assembly may comprise a housing comprising a cavity; a button provided within the cavity and moveable along a first axis within the cavity; at least one intermediate moveable element provided within the cavity in contact with the button and moveable in a plane defined by the first axis and a second axis, the second axis being perpendicular to the first axis, and arranged to drive movement of the button along the first axis; and at least one SMA wire coupled to the at least one intermediate moveable element and arranged to, on contraction, move the intermediate moveable element in the plane.

Heat Transfer Material

In accordance with the present invention, each of the above-described SMA actuator assemblies 2 comprises a heat transfer material 30. The heat transfer material 30 is arranged between the first and second parts 4, 6 and around at least a portion of the SMA wire 10. In use, the heat transfer material 30 transfers heat between the SMA wire 10 and first and/or second parts 4, 6. The heat transfer material 30 surrounds and is in direct contact with the portion of the SMA wire 10. The heat transfer material 30 is in direct contact with at least one of the first and second parts 4, 6. Preferably, the heat transfer material 30 is in direct contact with both of the first and second parts 4, 6.

The heat transfer material 30 is configured to deform so as to allow relative movement of the first and second parts 4, 6. In embodiments in which the heat transfer material 30 is in direct contact with both first and second parts 4, 6, deformation of the heat transfer material 30 may be due to relative movement of the first and second parts 4, 6. The heat transfer material 30 may remain in direct contact with the first and second parts throughout the range of movement of the first part relative to the second part. Generally, the heat transfer material 30 may remain in direct contact with the portion of the SMA wire 30 throughout the range of movement of the first part relative to the second part. The range of movement may be defined by an operating range of the SMA wires. In embodiments with endstops, the range of movement may be defined by the movement limits imparted by the endstops.

The portion of the SMA wire 10 may be a major portion of the SMA wire 10. The portion of the SMA wire 10 may be at least 50% of the length of the SMA wire 10 between the connection elements, preferably at least 75%, further preferably at least 90%. In some embodiments, substantially the entire length of the SMA wire 10 may be surrounded by the heat transfer material 30.

The heat transfer material 30 may be arranged to undergo shear deformation when the first and second parts are moved relative to each other. This may reduce the risk of damage to the heat transfer material 30, for example compared to a situation in which it was placed under pure compression or tension. For this purpose, the heat transfer material 30 may have a shear modulus, in a direction parallel to the relative movement between first and second parts, of less than 100 kPa, preferably less than 10 kPa, further preferably less than 1 kPa. The shear modulus may be along the movement axis M (for the embodiment of FIG. 1) or in the movement plane M (for the embodiment of FIG. 2). The heat transfer material 30 may be arranged not to undergo compression or extension when the first and second parts are moved relative to each other. The heat transfer material 30 may deform elastically, i.e. return to its original shape when actuation of the SMA wire 10 ceases.

The thickness of the heat transfer material 30 in a direction perpendicular to the movement axis M or movement plane M may be greater than a thickness at which the heat transfer material would undergo shear failure, over the entire range of movement of the first part 4 relative to the second part 6. For this purpose, the minimum thickness of the heat transfer material in a direction perpendicular to the one or two movement axes may be greater than 10 µm, preferably greater than 20 µm, further preferably greater than 50 µm, most preferably greater than 150 µm. The minimum thickness of the heat transfer material 30 may be less than 4 mm, preferably less than 2 mm, further preferably less than 1.5 mm, most preferably less than 1 mm or less than 600 µm. The minimum thickness of the heat transfer material may depend on material properties of the heat transfer material, such as the shear modulus and the thermal conductivity of the heat transfer material.

The heat transfer material 30 may transfer heat from the SMA wire 10, thereby aiding in the cooling of the SMA wire 10. Faster cooling allows the SMA wire 10 to be actuated at higher frequencies and with faster response times. To increase the cooling rate of the SMA wire 10, the heat transfer material may have a thermal conductivity greater than 0.1 W/K. The heat transfer material 10 may also comprise thermally conductive particles, in particular metal particles. This may increase heat conductivity of the heat transfer material 30 compared to a situation in which such particles are not provided. The thermally conductive particles may be suspended in a matrix of deformable material, such as rubber, silicone, a gel, and a liquid.

The heat transfer material 30 may comprise one or more of rubber or other elastic material, silicone, a gel, and a liquid. These materials may allow shear deformation of the heat transfer material 30.

The heat transfer material 30 may be an elastic material. The heat transfer material may be configured to bias the relative position of the first and second parts to a starting position or central position, in particular when the SMA wires 10 are not actuated. So, the heat transfer material may at least in part act as a biasing arrangement of the SMA actuator assembly 2.

The heat transfer material 30 may be arranged to suspend the first and second parts 4, 6 relative to each other. The heat transfer material 30 may be arranged to guide relative movement of the first and second parts 4, 6. So, the heat transfer material 30 may at least in part act as a bearing arrangement of the SMA actuator assembly 2.

The SMA actuator assembly 2 may comprise retainment means for retaining the heat transfer material 30. The retainment means may, for example, comprise pockets in the first and/or second parts for retaining at least a portion of the heat transfer material 30. This may reduce the risk of the heat transfer material 30 being dislodged from its position during actuation of the SMA actuator assembly 2 or during drops.

In the embodiment of FIG. 2, or in other embodiments in which planar relative movement of the first and second parts is provided, the heat transfer material 30 may be arranged between substantially surfaces of the first and second parts that expand substantially parallel to the movement plane M. The first and second parts 4, 6 may comprise plates, for example, and the heat transfer material 30 may be provided between the plates. Movement of the first and second parts in the movement plane M will lead to shear deformation of the heat transfer material 30. Movement perpendicular to the movement plane M may be constrained.

In the embodiment of FIG. 1, the heat transfer material 30 may be arranged between adjacent contact portions of the first and second parts in a direction perpendicular to the movement axis M. So, the heat transfer material 30 is arranged between adjacent teeth of the first and second parts in a direction perpendicular to the movement axis M. As shown in FIG. 1, there may be a gap between the heat transfer material 30 and the first and/or second parts 4, 6 in a direction along the movement axis. This may facilitate shear deformation of the heat transfer material 30 upon actuation of the SMA wire 10 and avoid compression or extension of the heat transfer material 30 (which might risk damage thereof).

The above-described SMA actuator assemblies comprise an SMA wire. The term 'shape memory alloy (SMA) wire' may refer to any element comprising SMA. The SMA wire may have any shape that is suitable for the purposes described herein. The SMA wire may be elongate and may have a round cross section or any other shape cross section. The cross section may vary along the length of the SMA wire. It is also possible that the length of the SMA wire (however defined) may be similar to one or more of its other dimensions. The SMA wire may be pliant or, in other words, flexible. In some examples, when connected in a straight line between two elements, the SMA wire can apply only a tensile force which urges the two elements together. In other examples, the SMA wire may be bent around an element and can apply a force to the element as the SMA wire tends to straighten under tension. The SMA wire may be beam-like or rigid and may be able to apply different (e.g. non-tensile) forces to elements. The SMA wire may or may not include material(s) and/or component(s) that are not SMA. For example, the SMA wire may comprise a core of SMA and a coating of non-SMA material. Unless the context requires otherwise, the term 'SMA wire' may refer to any configuration of SMA wire acting as a single actuating element which, for example, can be individually controlled to produce a force on an element. For example, the SMA wire may comprise two or more portions of SMA wire that are arranged mechanically in parallel and/or in series. In some arrangements, the SMA wire may be part of a larger piece of SMA wire. Such a larger piece of SMA wire might comprise two or more parts that are individually controllable, thereby forming two or more SMA wires.

It will be appreciated that there may be many other variations of the above-described examples. The scope of the invention is defined by the claims.

The invention claimed is:

1. An SMA actuator assembly comprising:
   first and second parts that are movable relative to each other;
   an SMA wire arranged, on contraction, to drive relative movement of the first and second parts; and
   a heat transfer material arranged between the first and second parts and around at least a portion of the SMA wire to transfer heat between the SMA wire and first and/or second parts, wherein the heat transfer material is configured to deform to allow relative movement of the first and second parts;
   wherein the heat transfer material is arranged to undergo shear deformation when the first and second parts are moved relative to each other.

2. An SMA actuator assembly according to claim 1, wherein the heat transfer material has a shear modulus, in a direction parallel to the relative movement between first and second parts, of less than 100 kPa.

3. An SMA actuator assembly according to claim 1, wherein the heat transfer material is arranged not to undergo compression or extension when the first and second parts are moved relative to each other.

4. An SMA actuator assembly according to claim 1, wherein the first and second parts are movable relative to each other along one or two movement axes.

5. An SMA actuator assembly according to claim 4, wherein the thickness of the heat transfer material in a direction perpendicular to the one or two movement axes is greater than a thickness at which the heat transfer material would undergo shear failure, over the entire range of relative movement of the first and second parts.

6. An SMA actuator assembly according to claim 4, wherein the minimum thickness of the heat transfer material in a direction perpendicular to the one or two movement axes is greater than 10 μm.

7. An SMA actuator assembly according to claim 4, wherein the minimum thickness of the heat transfer material in a direction perpendicular to the one or more movement axes is less than 4 mm.

8. An SMA actuator assembly according to claim 1, wherein the heat transfer material has a thermal conductivity greater than 0.1 W/K.

9. An SMA actuator assembly according to claim 1, wherein the heat transfer material comprises thermally conductive metal particles.

10. An SMA actuator assembly according to claim 1, wherein the heat transfer material comprises one or more of rubber, silicone, a gel, or a liquid.

11. An SMA actuator assembly according to claim 1, wherein the heat transfer material comprises an elastic material and is further configured to bias the relative position of the first and second parts to a starting position.

12. An SMA actuator assembly according to claim 1, wherein the heat transfer material is arranged to suspend the first and second parts relative to each other.

13. An SMA actuator assembly according to claim 1, wherein the heat transfer material is arranged to guide relative movement of the first and second parts.

14. An SMA actuator assembly according to claim 1, wherein;
   the first and second parts are movable relative to each other along a movement axis; and
   the first part comprises at least one contact portion making contact with the SMA wire on a first side of the SMA wire along the movement axis, the second part comprises plural contact portions making contact with the SMA wire on a second side of the SMA wire along the movement axis, opposite to the first side, the at least one contact portion of the first part and the plural contact portions of the second part alternating in a direction normal to the movement axis and being relatively positioned to guide the SMA wire along a tortuous path such that the first and second parts are driven in opposite directions along the movement axis on contraction of the SMA wire.

15. The SMA actuator assembly of claim 14, wherein the heat transfer material is arranged between adjacent contact portions of the first and second parts in a direction perpendicular to the movement axis.

16. The SMA actuator assembly of claim 14, comprising a gap between the heat transfer material and the first and/or second parts in a direction along the movement axis.

17. An SMA actuator assembly according to claim 1, further comprising a lens element fixed relative to one of the first and second parts and an image sensor fixed relative to the other of the first and second parts.

18. An SMA actuator assembly according to claim 1, wherein;
   the first and second parts are movable relative to each another along two orthogonal axes; and
   the SMA actuator assembly comprises a total of four SMA wires in an arrangement where none of the SMA wires are collinear, and where the SMA wires are capable of being selectively driven to move the first and second parts relative to each other along the two orthogonal axes without applying any net torque between the first and second parts.

19. An SMA actuator assembly according to claim 18, wherein two of the SMA wires are connected between the first and second parts to each apply a torque between the first and second parts in a first sense around an axis perpendicular to the two orthogonal axes, and the other two SMA wires are connected between the first and second part to each apply a torque between the first and second parts in a second, opposite sense around the axis perpendicular to the two orthogonal axes.

* * * * *